Feb. 2, 1943.   J. E. HARVEY, JR   2,309,954
PRODUCTION OF VALUABLE LIQUIDS FROM LIQUID AND SOLID HYDROCARBONS
Filed June 20, 1940
STARTING FEED & HYDROGEN
PLUS ADDED SULPHUR
HYDROGENATION CHAMBER
END PRODUCT:
WOOD PRESERVATIVES
Inventor
Jacquelin E. Harvey, Jr.
By Nelson J Jewitt
Attorneys Patented Feb. 2, 1943

2,309,954

UNITED STATES PATENT OFFICE 2,309,954

PRODUCTION OF VALUABLE LIQUIDS FROM LIQUID AND SOLID HYDROCARBONS

Jacquelin E. Harvey, Jr., Atlanta, Ga., assignor of one-half to Southern Wood Preserving Company, East Point, Ga., a corporation of Georgia Application June 20, 1940, Serial No. 341,594

1 Claim. (Cl. 196—53)

The present invention relates to the production of valuable liquids from liquid and solid hydrocarbons with lowering of boiling range.

An object of the invention is the conversion of solid and liquid hydrocarbons, or of substances containing hydrocarbons, into liquids having induced characteristics.

A further and more specific object of the present invention is the inducing of toxicity in hydrocarbons of relatively low or no toxicity, which statement includes improvement of toxic value in all hydrocarbons.

A further specific object of the present invention is the inducing of toxicity in tars whereby to make said tars usable, substantially in entirety, if desired, as a wood preservative which may conform to current and accepted trade specifications, or may be acceptable to consumers.

In my former Patents Nos. 2,082,885 and Reissue 21,348 are described methods for the production of wood preservatives of enhanced toxic value from tars and fractions thereof wherein said tars and fractions thereof are converted substantially in their entirety into wood preservatives, that is to say, conversions of in the order of 80% to 100%.

It is now discovered that aforesaid conversion, including toxicity induction, can be more smoothly accomplished and enhanced by the process of the present invention.

As far as applicant understands the present invention, it appears to be predicated on the following: that the addition of sulphur or hydrogen sulfide, or materials providing for the generation of hydrogen sulfide enhance the recoveries of wood preservative of enhanced toxic value named in above patents.

In the matter of enhanced toxicity induction by hydrogen action when practiced in the presence of a sulfur derivative, as for instance hydrogen sulfide, the effect of sulfur employment may be explained as reducing the "toxicity blanketing effect" of the residual in the oil above 270° C. as compared to a product from a similar process without sulfur. In tar derived wood preservatives, there is a definite and known lowering of toxicity in the overall product due to the residual of the oil boiling above 270° C. In a wood preserving impregnant produced in accordance with the instant process, it may be explained that the residual above 270° C. has a diminished "lowering of toxicity effect" as compared to the residual above that temperature in the parent material, or a residual above that temperature in a wood preserving impregnant produced in accordance with the process of my former Patent No. 2,082,885, June 8, 1937.

The invention will be understood from the following description of illustrative steps comprising various methods of securing the objects of the invention, when read in connection with the accompanying drawing wherein the figure is a diagrammatic sketch of an apparatus for carrying out a form of the process of the invention and wherein the nature of the step carried out in each chamber and the contents thereof are indicated by legend.

*Example 1.*—A high residue boiling substantially 340–400° C. recovered from high residue creosote, and substantially free of sulphur was passed through a high pressure reaction chamber while simultaneously flowing hydrogen therethrough at a pressure of 300 atmospheres and 410° C., while contacting a molybdenum sulfide catalyst. The hydrogenated material was distilled and yielded approximately 35% boiling between 210° C. and 355° C. and had a toxicity in excess of its parent material, and was the wood preservative of enhanced toxic value of the present invention. At the end of the 24th hour of operation it was found that the induction of toxicity had decreased.

After further research it was found that the toxicity reduction was due to change in form of the molybdenum sulfide catalyst which was believed to be converted to some less effective form. One half of 1% sulphur, based on the starting material, was added to the high boiling residue and the process continued under aforenamed conditions; the original percentage of toxicity induction was approximated and continued until the run was finally shut down.

Some tars, and fractions thereof, have substantially a sufficiency of sulphur content, under which the conditions of the process enable the sulfide catalyst to be maintained in substantial sulfide form, that is to say, as opposed to conversion of the catalyst, due to deficiency of sulphur, into metal or the like.

Thus the present invention may be viewed as a process for hydrogenating tars, or fractions thereof, whereby to induce toxicity, said induction of toxicity being enhanced by effecting same in presence of a catalyst maintained in substantial sulfide form.

The catalysts that provide the enhancement of toxicity induction of the present process are the sulfides, as for instance, of the 6th periodic group; especially effective are the sulfides of molybdenum, uranium, vanadium, tin, cobalt, tungsten; in admixture or separately, or as component parts of and with other catalysts; all hydrogenating catalysts of sulfide form, promoted or not, extended or not as for instance on gels or the like, with or without small amounts of halogen derivatives; all in various shapes and forms.

The present invention is further predicated on that method of enhancing toxicity increment of and in tars, or fractions thereof, wherein said toxicity enhancement flows from maintenance of that partial pressure of hydrogen sulfide necessary to maintain the sulfide catalyst substantially in its sulfide form as opposed to conversion of said sulfide catalyst to other forms, including metals.

As stated, some tars and fractions thereof, may have substantially sufficient sulphur content to enable the catalyst, under the conditions of the process, to be maintained in substantial sulfide form. Other tars, and fractions thereof, may need sulphur of extraneous source added. If and when such sulphur addition is necessary, same may be supplied as such, or in gaseous form, or in any form that makes sulphur available in accordance with and for the stated purpose.

*Example 2.*—A coal tar, specific gravity 1.120, coke residue in excess of 8% and viscosity, coke residue and specific gravity too high for a good wood preservative, and boiling predominantly above 190° C. was passed through a high pressure reaction vessel, while simultaneously flowing hydrogen therethrough, at a pressure of 300 atmospheres and 400° C. Sulphur content of the reactants, which statement includes starting tar and hydrogen or hydrogen containing gas, was maintained at such a point as to provide a hydrogen sulfide partial pressure of at least a fractional atmosphere and preferably nearer one atmosphere or in some cases desirably above. The sulphur content necessary for said results was furnished by the sulphur initially present in the gas or starting tar and/or sulphur or sulphur bearing material of extraneous source. The beneficiated material resulting from one hour retention in the reaction zone was found to be suitable as a substitute for a creosote-coal tar solution wood preservative, because of its reduced coke residue, viscosity, specific gravity and enhanced toxic value as compared to the parent material. However, inasmuch as one of the popular wood preserving specifications covering a creosote-coal tar solution (A. W. P. A.) specifies not more than 5% at 210° C., it was found necessary to remove approximately 18% of low ends to make the beneficiated tar conform to said A. W. P. A. specifications, as regards low ends.

Research determined that maintenance of the catalyst in substantial sulfide form was necessary when co-ordinated with process variables for continued introduction of enhanced toxicity, and for continuous production of an oil suitable as a substitute for said creosote-coal tar solution flowing from said process controls. If desired, longer reaction periods may be provided with an optional increase of temperature and pressure to the end that the newly formed wood preservative more nearly serves as a substitute for certain grades of creosote, as for instance specifications of A. W. P. A., Prussian Ry., N. P. V. L. A. #220, or others, or private specifications. In all instances the newly formed oil may be relieved of its non-permissible low boiling ends, if any, to make same conform to any specification desired at any time; or the entirety of the newly formed oil may be used as providing a wood preservative of lowered coke residue, specific gravity and viscosity and enhanced toxic value, the overall beneficiation of which flows from, among other things, maintenance of the catalyst in substantial sulfide form while co-ordinating process variables for protection of aromatic nuclei.

*Example 3.*—Instead of using and processing the newly formed wood preservative as noted in Example 1, the newly formed oil having induced toxic properties, which induced toxic properties as is well known in the art stem from protecting the aromatic nuclei from excessive rupture and degradation, may be distilled to yield a distillate of enhanced toxic properties suitable to serve as a substitute for various grades of creosote. Thus, a cut may be made on the beneficiated material at 355° C. to provide a creosote substitute having little or no residue above said temperature. The distillate may be stripped of any low ends necessary for conformance to specification creosotes The residue incidental to said distillation may be used as an article of commerce having superior qualities, but which forms no part of the present invention. However, said residue may be recycled, with or without addition of other starting material.

Fractions of tar serve as the starting materials of the present invention, such as tar from which high boiling solvents have been removed, from high residues as for instance high residue creosote, pitches, crude or refined, or selected fractions, solid or liquid, acid or neutral.

*Example 4.*—As a specific example of a fractional part of tar that may serve as suitable starting material of the present process, a high boiling residue boiling 97% above 380° C., a coke residue in excess of 4%, and recovered from high residue creosote was subjected to the action of hydrogen in the presence of a sulfide catalyst at 400° C. and 200 atmospheres pressure, wherein hydrogen sulfide partial pressure was between a fractional atmosphere and 3 atmospheres; period of contact or treatment, one hour. At the end of the named period the beneficiated material was found to distill in the order of 2% below 210° C. and had a toxicity in excess of its parent material, and conformed in its boiling range to an A. W. P. A. creosote. However, if desired, the beneficiated material may be distilled to recover a low residue creosote, with the residue from said distillation serving as a plasticizer or binder account its superior qualities, or if desired may be recycled with or without addition of fresh tar or other tar derived starting material. In all foregoing examples shown, the enhanced toxicity induction is not accomplished unless there exists a hydrogen sulfide partial pressure of at least a fractional atmosphere.

Concerning tars and fractions thereof that serve as starting materials, tars derived from coal, petroleum or wood, as for instance coal tar, gas house tar, low temperature tar, high boiling aromatics extracted from petroleum, tars produced incidental to polymerization of gases, and high boiling fractions resulting from de-hydrogenating hydrocarbons will so serve.

Hydrogenations proceed at lowered temperatures and pressures, however the preferred temperatures are selected between the extremes of 200° C. and 650° C. and the preferred pressures between 20 and 300 atmospheres, or above.

By the term "beneficiated" is meant the starting material at least once subjected to the action of hydrogen in accordance with the present invention.

If low ends outside the specification or desired point are induced, distillation or the like, may be resorted to, to remove same to provide conformity. Thus, the present invention provides a method for converting tar, or fractions thereof, by the action of hydrogen and a hydrogen sulfide partial pressure of at least a fractional atmosphere, while in the presence of a sulfide catalyst, with time, temperature and pressure so controlled as to produce a wood preservative having lowered coke residue, viscosity and specific gravity whereby to provide a wood preservative of enhanced toxic properties as heretofore explained with recovery of the wood preservative, if desired, by distillation.

The hydrogen sulfide partial pressure forming an important part of the present invention, is that partial pressure necessary to maintain at least a portion of the catalyst in sulfide form, and may be held at a fractional atmosphere, or substantially one atmosphere, or above. When the feed stock passing through the reaction chamber consists of a substantial percentage of recycle material, added amounts of extraneous sulphur or hydrogen sulfide or sulphur materials necessary to maintain said sulfide catalyst in sulfide form may be necessary for said purpose.

The reaction zone of the present invention may consist of a single reaction chamber, a series thereof, or a parallel arrangement thereof, including a multiplicity thereof.

When using as a starting material a tar or tar fraction relatively high in carbon, it may be desirable to use a comminuted form of catalyst, which provides a condition that precludes, or at least precludes to a degree, the said starting material of relatively high carbon content from being spread out in thin films for possible thermal degradation—including coking—by the control conditions of the present process. Afterwards when the carbon content has been lowered by the treatment, a rigid catalyst may be used.

Suitable starting materials for the present invention include raw tar and fractions thereof, refined tar and fractions thereof, including tars or fractions thereof at least once refined by hydrogen.

Recourse may be had to impressing on the starting materials less vigorous process conditions when the starting material first contacts the reaction zone, thereafter increasing said process conditions to an operating optimum.

Thus, it will be seen that the present invention broadly includes the induction of toxicity in tars or fractions thereof while subjected to the action of hydrogen and a hydrogen sulfide partial pressure of at least a fractional atmosphere.

The wood preservatives which may be produced by the process of the present invention are varied and include substitutes for shingle stain oils among many other materials. The extreme flexibility of the process makes it controllable so as to provide a substitute for any type of wood preserving oil currently on the market, as for instance, among others, those covered by the following specifications, and it is to be strictly understood that the present process contemplates the provision of any wood preserving oil which may be dictated by future or changed specifications. This will be immediately apparent inasmuch as the present invention stems from the inducing of toxicity in hydrocarbons whereby to provide superior wood preservatives. By changes in temperature, pressure, time of reaction and/or sulphur content of the starting material when practicing the process, said changes applied as required by the starting material, and if necessary followed by stripping, any desired characteristic of product, including boiling points and boiling range, may be secured in a continuing manner, said continuance being limited only by catalyst age.

Below are shown boiling specifications of accepted wood preservatives.

WOOD PRESERVING IMPREGNANTS

*Specification*

1. A. W. P. A.
   a—up to 210° C., not more than 5%
   b—up to 235° C., not more than 25%
2. A. W. P. A.
   a—up to 210° C., not more than 1%
   b—up to 235° C., not more than 10%
   c—up to 355° C., not less than 65%
3. A. W. P. A.
   a—up to 235° C., not more than 1½%
   b—up to 300° C., not more than 16½%
   c—up to 355° C., not less than 45%
4. A. W. P. A.
   a—up to 210° C., not more than 8%
   b—up to 235° C., not more than 35%
5. A. W. P. A.
   a—up to 210° C., not more than 10%
   b—up to 235° C., not more than 40%
6. A. W. P. A.
   a—up to 210° C., not more than 5%
   b—up to 235° C., not more than 15%
7. Prussian Ry.
   a—up to 150° C., not more than 3%
   b—up to 200° C., not more than 10%
   c—up to 235° C., not more than 25%
8. N. P. V. & L. A. #220
   a—5% at 162° C.
   b—97% at 270° C.
9. S. P. S. S. O.
   a—5% at 137° C.
   b—95% at 257° C.
10. N. S. S. O.
    a—I. B. P., 150° C.
    b—5% at 205° C.
    c—95% at 292° C.

From the foregoing it will be seen that the wood preservatives of commerce are indeed variable quantities, as regards boiling range; in a like manner so are the wood preservatives of the present invention; and in like manner the wood preservatives which may be produced by the present invention are variable in characteristics, and are not characterized by any definite boiling range, but are rather characterized as being those conversion wood preserving products of induced toxicity flowing from the controlled direct or indirect action of hydrogen and hydrogen sulfide on tar fractions when treating said tar fractions in the presence of a catalyst; conformity, as for instance in boiling range, of the newly induced product of enhanced toxic value to provide usual wood preserving boiling ranges, being had by subsequent distillation.

Minor changes may be made within the scope of the following claim.

I claim:

The method of producing a preservative wood impregnant which comprises: subjecting a mixture of high temperature coal tar fractions to the action of hydrogen in the presence of a sulfide catalyst with time, temperature and pressure so controlled as to induce newly formed toxic fractions, the while reducing coke residue, specific gravity and viscosity; lowering toxicity blanketing effect in fractions boiling above 270° C. on the newly formed fractions of induced toxicity boiling below that temperature by inclusion during said hydrogen action of a partial pressure of at least about one atmosphere of hydrogen sulfide a portion of which is derived from an extraneous source; coordinating the process variables above named so as to provide total conversion of the starting material into an oil of the wood preserving type having toxicity in excess of its parent material and being further characterized by not in excess of 35% boiling at 235° C.

JACQUELIN E. HARVEY, JR.